No. 833,396. PATENTED OCT. 16, 1906.
W. B. KLINE.
JOINT MEANS FOR RAILS OR THE LIKE.
APPLICATION FILED APR. 18, 1905.
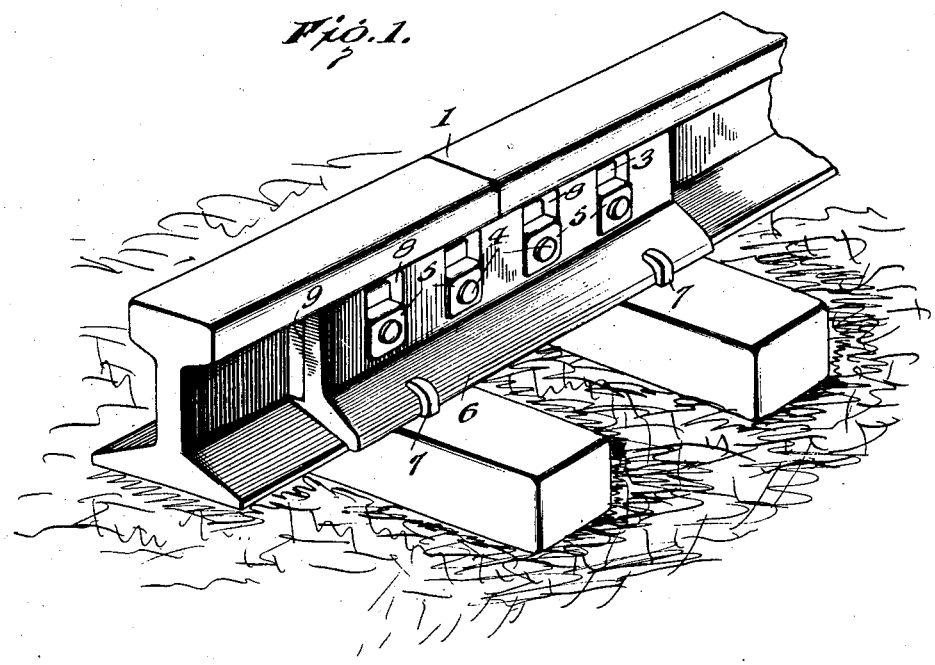
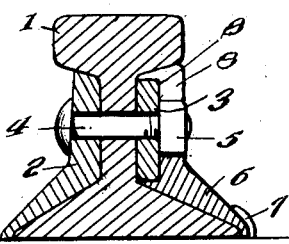
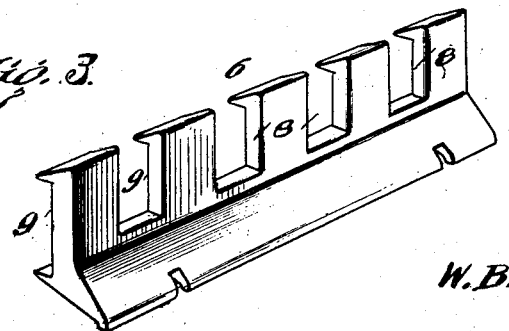
Witnesses
Inventor
W. B. Kline
By R. S. & A. B. Lacey
Attorneys

UNITED STATES PATENT OFFICE.

WILLIAM BENNET KLINE, OF TIMPSON, TEXAS.

JOINT MEANS FOR RAILS OR THE LIKE.

No. 833,396.      Specification of Letters Patent.      Patented Oct. 16, 1906.

Application filed April 18, 1905. Serial No. 256,332. (Model.)

*To all whom it may concern:*

Be it known that I, WILLIAM BENNET KLINE, a citizen of the United States, residing at Timpson, in the county of Shelby and the State of Texas, have invented a new and useful Joint Means for Rails or the Like, of which the following is a specification.

This invention embodies improved means for joining rails and the like, in which bolts and nuts are utilized to connect the parts, the joint means being such as to provide locking means for preventing accidental displacement of the nuts from the bolts.

For a full description of the invention and the merits thereof and also to acquire a knowledge of the details of construction of the means for effecting the result reference is to be had to the following description and accompanying drawings, in which—

Figure 1 is a perspective view showing the invention applied as means for joining adjacent ends of rails. Fig. 2 is a vertical transverse section. Fig. 3 is a detail perspective view of the nut-locking angle-bar.

Corresponding and like parts are referred to in the following description and indicated in all the views of the drawings by the same reference characters.

In the drawings the numeral 1 indicates the rails, joined by means of the angle-bars 2 and 6 and by a fish-plate 3. The angle-bar 2 abuts with the side portions of the rails 1 at the ends thereof in the customary way, whereas the angle-bar 6 is of peculiar construction in order that it may afford a means for locking the nuts 5 of bolts 4, used to secure the parts together, from displacement. The bolts 4 pass through the rails 1, the angle-bar 2, and the fish-plate 3, the latter having openings to receive said bolts. The fish-plate 3 is arranged between the vertical portion of the angle-bar 6 and the adjacent side portions of the rails 1, this portion of the angle-bar being provided upon the inner side thereof with a longitudinal recess 9, in which the fish-plate 3 is seated when the parts are arranged in operative position. The angle-bar 6 is formed with a plurality of notches or recesses 8, one of which is provided for each nut 5 of the bolt 4, so as to admit of disposition of the angle-bar 6 in such a way that the several nuts 5 will each be arranged in a corresponding recess 8, snugly fitting therein so as to be prevented from turning. The upper portion of the angle-bar 6, abutting with the under side of the ball or head of the rails, closely fits against the outer side of the fish-plate 3, and the lower portion of said bar 6 rests upon the base portions of the rail ends, as clearly shown in the drawings. The bar 6 is held in place by spikes 7 or similar fastenings driven into the ties, and said spikes 7 engage in notches in the lower edge portions of the bar 6 and hold said bar firmly against the outer side of the fish-plate 3, the parts being held compactly together and arranged so that the fish-plate 3 and the angle-bar 6 coact to afford a rigid bearing at one side of the rail ends.

Having thus described the invention, what is claimed as new is—

In a rail-joint, the combination of the abutted ends of adjacent rails, an angle-bar arranged along one side of the rails and overlapping the joint and fitting close to the foot and web and coming up under the head of the rails, a fish-bar placed against the opposite side of the rails and extending upon each side of the joint and spaced at its upper edge from the head and at its lower edge from the foot of the rails, bolts connecting the angle-bar, the rails and the fish-bar, nuts mounted upon the threaded ends of the bolts, and an angle lock-bar spiked to the ties and overlying the foot of the rails and said fish-bar and having notches in its upper edge to receive the aforesaid nuts and having upper and lower horizontal ribs to enter the horizontal spaces formed between the upper and lower edges of said fish-bar and the head and foot of the rails to strengthen and brace the same.

In testimony whereof I hereunto set my hand by signing my name to this specification in the presence of two subscribing witnesses.

WILLIAM BENNET KLINE.

Witnesses:
    A. SCHERZ,
    W. A. FETT.